United States Patent [19]

Kaminski

[11] Patent Number: 4,709,177

[45] Date of Patent: Nov. 24, 1987

[54] VENTILATED END TURNS FOR ROTOR WINDINGS OF A DYNAMOELECTRIC MACHINE

[75] Inventor: Christopher A. Kaminski, Schenectady, N.Y.

[73] Assignee: General Electric Company, Schenectady, N.Y.

[21] Appl. No.: 880,465

[22] Filed: Jun. 30, 1986

[51] Int. Cl.[4] .......................... H02K 1/20; H02K 3/22
[52] U.S. Cl. ..................................... 310/59; 310/61; 310/214
[58] Field of Search ...................... 310/54, 55, 59, 61, 310/65, 214, 216, 270, 215

[56] References Cited

U.S. PATENT DOCUMENTS

| 2,787,721 | 4/1957 | Tudge | 310/61 |
| 2,833,944 | 5/1958 | Willyoung | |
| 3,005,119 | 10/1961 | Schmitt et al. | |
| 3,749,952 | 7/1973 | Lambrecht et al. | 310/54 |
| 4,543,503 | 9/1985 | Kaminski et al. | |

FOREIGN PATENT DOCUMENTS 1352884  1/1964  France ................................. 310/59
868467  5/1961  United Kingdom ................. 310/61

Primary Examiner—Patrick R. Salce
Assistant Examiner—D. L. Rebsch
Attorney, Agent, or Firm—Jerome C. Squillaro

[57] ABSTRACT

A ventilation system for end turn conductors spanning a pole face of a rotor of a dynamoelectric machine includes a first plurality of end turn conductors having a first plurality of longitudinally extending ducts having a respective coolant gas inlet disposed proximate the pole center and a respective coolant gas outlet disposed inboard of the end of the rotor body, and a second plurality of end turn conductors alternately stacked with, electrically insulated from and disposed in heat flow communication with the first plurality of end turn conductors. Each of the second plurality of end turn conductors includes a longitudinally extending gas coolant duct, having a coolant gas inlet proximate the winding corner and a coolant gas outlet inboard the end of the rotor body. The system is especially applicable to rotor windings wherein the conductors forming the end turns are not large enough to carry adjacent gas coolant ducts without compromising the structural and mechanical integrity of the winding.

14 Claims, 3 Drawing Figures

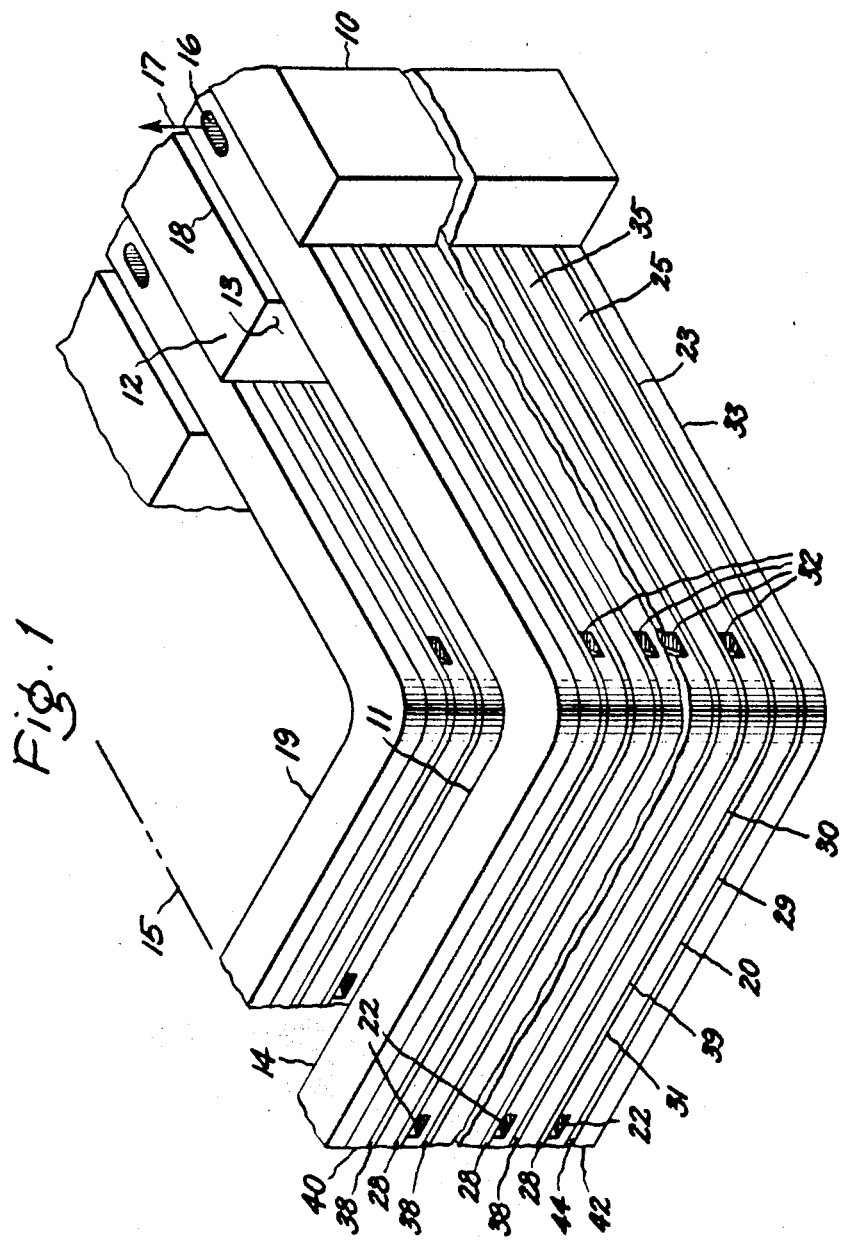

U.S. Patent  Nov. 24, 1987  Sheet 2 of 2  4,709,177
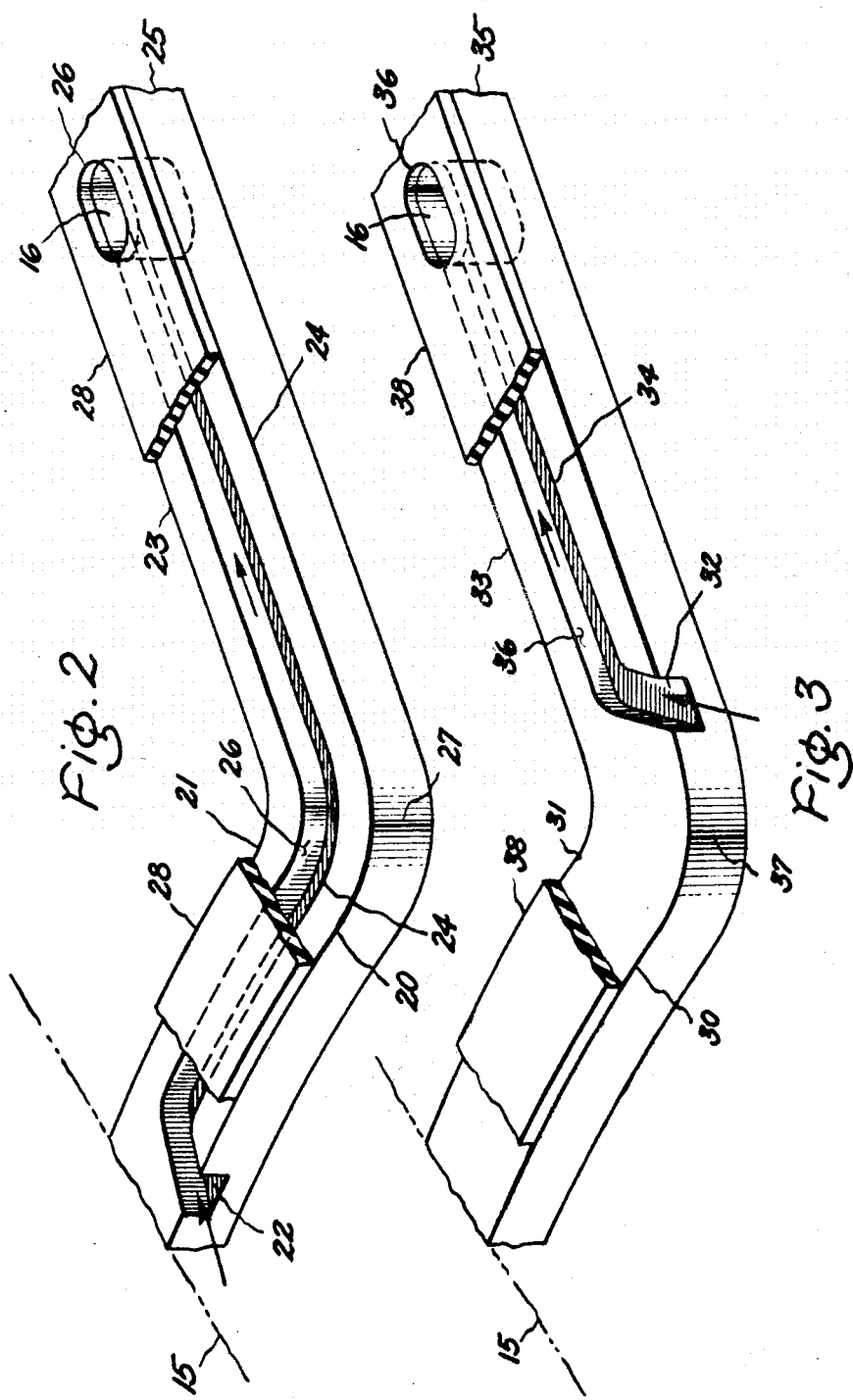

VENTILATED END TURNS FOR ROTOR WINDINGS OF A DYNAMOELECTRIC MACHINE

BACKGROUND OF THE INVENTION

This invention relates generally to the rotor windings of a dynamoelectric machine, and more particularly, to means for ventilating the end turn conductors of the windings.

For uniformity and ease of understanding, the following terms when used in this specification and claims, have the meaning specified. It is to be understood that the technical literature does not necessarily always agree, nor is it always internally consistent. A conductor, the element which conducts electricity, typically comprises copper and forms the other members of the current carrying path. A turn is one electrical loop around a pole of a rotor. A coil comprises all turns that are disposed in a predetermined axially extending slot, or coil slot, in the circumference of the rotor. A winding comprises all concentric coils in the rotor.

A rotor of a gas cooled dynamoelectric machine includes a central rotor body portion defining a plurality of axially extending coil slots within which are disposed a plurality of coils. The slots are circumferentially spaced on the periphery of the rotor body on either side of a pole portion of the body such that all coils disposed about the same pole portion are typically concentric and form a winding of the rotor.

In order to generate an electromagnetic field for the dynamoelectric machine, a respective plurality of conductors constituting the winding carries current in loops about each pole of the rotor. The conductors axially extend and are radially stacked in the coil slots to form turns with layers of insulation interposed between each turn. When current is flowing in the conductors, heat is generated by $I^2R$ losses in the conductors. Rotor windings with non-uniform temperature profiles experience higher levels of thermal distortion and vibration, due in part to increased thermal expansion, and consequently a lower level of reliability than rotor windings with uniform temperature distributions.

Many cooling schemes for directly cooling rotor windings use coolant gas flow through a path in a longitudinal duct of a conductor. However, since coolant gas that flows in a longitudinal duct in a conductor experiences an increase in temperature as it picks up heat along the length of the duct, rotor windings with long coolant ducts produce large temperature rises in the coolant gas and associated conductor. The longer the cooling duct is, without provision of supplemental cooling, the greater is the hot spot temperature, i.e. maximum absolute temperature, and the higher is the average temperature of the coil. Local hot spots are sometimes minimized by situating a second duct in each turn in the vicinity of the hot spot. However, on some rotor winding designs the conductors forming the turns are too narrow to accommodate two grooves in the same turn.

In one known cooling scheme, coolant gas enters a single channel near the pole centerline and flows through the turn corner and axially toward the rotor body. The flow in a radially outer and in an adjacent radially inner turn join into a single channel disposed in the radial outer of the two turns. Gas from the radially inner turn joins the flow of gas in the radially outer turn through a hole in the copper coil and turn insulation located just outboard the axial end of the rotor body. A fresh supply of coolant gas is then introduced into the radially inner turn just inboard the location at which the two outboard gas flows are combined.

Another scheme involves separate internal passages disposed in the axially lying portions of the coil and the circumferential end portions of the coil, respectively. Gas flowing in the circumferential end portion is kept separate from gas in the axially lying conductors by an elaborate and expensive baffling scheme. Coolant gas may be discharged through the centering ring or pole face of the dynamoelectric machine. Baffling is also required for winding coolant systems that have a gas inlet and gas outlet disposed relatively close to each other in order to maintain adequate gas pressure differential for urging coolant gas flow through internal passageways in the conductors.

Accordingly, it is an object of the present invention to provide cooling of the rotor winding of a dynamoelectric machine wherein the rotor winding includes narrow turns which will not accommodate two adjacently disposed gas passages.

Another object of the present invention is to maintain a substantially uniform temperature profile in the end turn of a rotor winding.

Yet another object of the present invention is to eliminate the need for baffling, such as is required in ventilation schemes that discharge coolant gas through the centering ring or the pole face of a dynamoelectric machine.

SUMMARY OF THE INVENTION

In accordance with the present invention, a rotor for a dynamoelectric machine comprises a body portion defining axial winding slots circumferentially spaced on the periphery of the body on either side of a pole portion and a rotor winding. The rotor winding includes a first plurality of axially extending slot lying conductors disposed in the winding slots and a first plurality of end turns extending beyond the rotor body. The first plurality of end turns includes a first plurality of axial end turn conductors formed by extensions of the first plurality of slot lying conductors and a first plurality of end turn circumferential conductors respectively connecting the first plurality of axial end turn conductors. The rotor winding further includes a second plurality of axially extending slot lying conductors disposed in the winding slots, respective ones of said second plurality of slot lying conductors being electrically insulated from respective adjacent ones of the first plurality of slot lying conductors. A second plurality of end turns extends beyond the rotor body and is alternately disposed with the first plurality of end turns. Respective ones of the second plurality of end turns are electrically insulated from yet disposed in heat flow communication with respective adjacent ones of the first plurality of end turns. The second plurality of end turns includes a second plurality of axial end turn conductors formed by extensions of the second plurality of slot lying conductors and further includes a second plurality of end turn circumferential conductors respectively connecting said second plurality of axial end turn conductors. The first plurality of end turns includes a respective first plurality of coolant gas flow channels longitudinally extending along the first plurality of end turns, wherein the first plurality of coolant gas channels has a respective first plurality of coolant gas inlets respectively disposed in the first plurality of end turn circumferential conductors. The second plurality of end turns includes a respective second plurality of coolant gas flow channels longitudinally extending along the second plurality of end turns, wherein the second plurality of coolant gas channels has a respective second plurality of coolant gas inlets respectively disposed in the second plurality of axial end turn conductors.

The first plurality of coolant gas inlets may be disposed proximate the centerline of the pole portion of the rotor and the second plurality of coolant gas inputs may be disposed proximate a corner at the juncture of the second plurality of end turn circumferential conductors and the plurality of axial end turn conductors. Thus, the developed length from the first plurality of coolant gas inlets to the axial end of the rotor body is longer than the developed length from the second plurality of coolant gas inlets to the axial end of the rotor body. Also, insulation disposed between end turns may form a surface of the first and second plurality of gas flow channels.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWING

FIG. 1 is an isometric view of an end region quadrant of a rotor winding of a dynamoelectric machine in accordance with the present invention.

FIG. 2 is an isolated view of one turn of FIG. 1.

FIG. 3 is an isolated view of another turn of FIG. 1.

DETAILED DESCRIPTION

With reference to FIG. 1, an isometric view of a quadrant of a end turn region of a dynamoelectric machine is shown. The dynamoelectric machine comprises a central body portion 10 defining axial coil slots 18 circumferentially spaced on the periphery of rotor body 10 on either side of a pole portion 12 of rotor 10. It is to be understood that the end turn region is symmetrical about pole face center 15 and thus, in order to avoid undue repetition, only so much of the end turn region is shown as is necessary for one of ordinary skill in the art to appreciate the invention.

A rotor coil 11 comprises a plurality of alternately stacked conductors 20 and 30 having a layer of insulation 28 and 38 disposed over the radially outer surface thereof, respectively. Since each turn shown includes a single conductor, the terms "conductor" and "turn" may be used interchangeably. However, the present invention may be beneficially employed with multiple conductor turns. A radially outermost, or top turn, 40 is disposed radially outward of insulation 38 and a layer of insulation 14 is disposed radially outward of top turn 40. A radially innermost, or bottom turn, 42 having a layer of insulation 44 disposed on the radial outer surface thereof, is positioned radially inward from most radially inwardly disposed turn 20. Turns 20, 30, 40 and 42 may be similarly fabricated except for the provisions for cooling thereof to be described herein. Typically a slot wedge (not shown) is disposed radially outward of insulation 14 for securing coil 11 within slot 18. Also shown is another coil 19 of the winding which may be fabricated analogously to coil 11.

Turn 20 includes an axially extending slot-lying portion 25 disposed in coil slot 18 and an end turn 29. End turn 29 includes an end turn axial portion 23 formed by an extension of slot-lying portion 25 and an end turn circumferential portion 21 coupled to end turn axial portion 23. Similarly, turn 30 includes an axially extending slot-lying portion 35 disposed in coil slot 18 and an end turn 39. End turn 39 includes an end turn axial portion 33 formed by an extension of slot-lying portion 35 and an end turn circumferential portion 31 coupled to end turn axial portion 33. End turns 39 are alternately disposed with end turns 29 and adjacent ones of end turns 29 and 39 are disposed in mutual heat flow communication Turns 20, 30, 40 and 42 are appropriately electrically insulated (not shown) from rotor body 10 as is known in the art.

With reference to FIG. 2, an isolated view of conductor, or turn, 20 is shown. Conductor 20 includes a surface 26 for defining a longitudinal gas flow channel 24 therein. Channel 24 is not entirely encircled by conductor 20 but is enclosed by overlying insulation 28 to form a duct for directing gas flow from inlet 22 of channel 24 to outlet 26 of channel 24. Outlet 26 includes a radially directed hole through both conductor 20 and overlying insulation 28. Inlet 22 of channel 24 is disposed in a lateral side of turn 20 and close to yet spaced from pole centerline 15 so that pole centerline 15 does not intersect input 22 or channel 24.

With reference to FIG. 3, an isolated view of conductor, or turn, 30 is shown. Conductor 30 includes a surface 36 for defining a longitudinal gas flow channel 34 therein. Channel 34 is not completely surrounded by conductor 30 so that overlying insulation 38 in cooperation with channel 34 forms a gas carrying duct. Channel 34 is substantially disposed in end turn axial portion 33 and extends axially inboard of pole face 12 to outlet 36 of channel 34. Outlet 36 includes a generally radially extending hole through both conductor 30 and overlying insulation 38, such that when conductor 20 (FIG. 2) and conductor 30 are appropriately disposed in coil slot 18 (FIG. 1), outlet 26 (FIG. 2) and outlet 36 are registered to form a generally radially extending chimney 16. Chimney 16 directs gas flow entering inlet 32 of channel 34 and inlet 22 of channel 24 (FIG. 2) to ultimately exit into the gap between the stator (not shown) and rotor 10 of the dynamoelectric machine. Coolant gas inlet 32 is disposed in a lateral side of conductor 30 and axially spaced between axial end 13 (FIG. 1) of rotor 10 and corner 37 of conductor 30. Preferably coolant gas inlet 32 is spaced as close as possible to corner 37 of conductor 30 without compromising the mechanical and structural integrity of corner 37.

Conductors 20 and 30 are alternately stacked so that on alternate turns, say those including conductor 20, cold coolant gas enters duct 24 at inlet 22 thereof. For the turns including conductor 30, cold coolant gas enters passage 34 at inlet 32. For each quadrant of a coil, all passages 24 and 34 discharge into a respective common chimney 16 which is disposed inboard of axial end 13 of rotor body 10. Arrow 17 (FIG. 1) represents gas flow direction from chimney 16.

It is noted that in the embodiment shown in FIG. 1, top turn 40 and bottom turn 42 do not include a coolant passage or duct. However, a coolant passage may be provided in either or both of top turn 40 and bottom turn 42 if desired. Also, the order of stacking conductors 20 and 30 in the end turn region may be altered from that shown in FIG. 1, such as for example, disposing conductor 30 immediately radially outward bottom turn 42 and then alternately stacking conductors 20 and 30. It may also be observed from FIG. 1 that no baffling is required for directing flow of coolant gas within the end region and/or for urging coolant gas flow into channel 24 and 34 of the dynamoelectric machine.

In prior cooling schemes having a conductor analogous to conductor 20 of the present invention, coolant gas may be introduced into a second channel disposed in the axial end turn portion of the analogous conductor so that there are two side-by-side longitudinally extending gas flow channels disposed in the axial end turn portion of the analogous conductor. However, the present invention is directed toward cooling end turns wherein the conductors are not of sufficient size to support two side-by-side coolant gas passageways in the same conductor, which passageways are of adequate size to provide required coolant gas flow through the conductor, while still maintaining structural integrity of the conductors necessary for proper operation of the dynamoelectric machine.

During operation, coolant gas enters channel 24 of conductor 20 at coolant gas inlet 22. As coolant gas flows along channel 24 in circumferential portion 21 of conductor 20, it removes heat from conductor 20 and also removes some heat from adjacent conductors 30 that are respectively disposed radially inward and radially outward of conductor 20. Removal of heat from circumferential portion 31 of conductors 30 by coolant gas flowing through channel 24 of conductor 20 requires that heat from conductor 30 flow through insulation 28 or 38. It has been found that adequate heat flow is obtained if insulation 28 and 38 are each respectively about 0.010 to about 0.020 inches thick and preferably about 0.015 inches thick. Insulation 28 and 38 may respectively include a woven polyester glass material or other conventional electrical insulating material, as it has been determined that the heat transfer characteristics of such materials for the specified thicknesses and application do not significantly vary and provide adequate heat transfer for maintaining a desired temperature profile of circumferential portion 31 of conductors 30.

Although coolant gas which enters inlet 22 is relatively cold, the temperature of this gas rises as it picks up heat while flowing along channel 24, such that it may lose much of its cooling effectiveness by the time it arrives at turn corner 27. To offset this loss in cooling effectiveness of gas flowing axially inward toward rotor body 10 from corner 27, a fresh supply of relatively cold coolant gas is directed into inlet 32 of channel 34 of conductors 30. Coolant gas which flows in channel 34 of conductor 30 removes heat dissipated in conductor 30 and also removes through insulation 28 or 38 some of the heat dissipated in conductors 20 that are disposed immediately radially inward and immediately radially outward conductor 30. Insulation 28 and 38 overlaying end turn axial portion 23 and 33, respectively, may be the same as insulation 28 and 38 overlaying end turn circumferential portions 21 and 31, respectively, as hereinbefore described.

The temperature of coolant gas flowing in the portion of channel 24 disposed in axial end turn portion 23 of conductor 20 is typically close to the temperature of the material which forms conductor 20 so that gas flow through this portion of channel 24 of conductor 20 removes very little additional heat from conductor 20 and/or conductors 30. By appropriately positioning inlet 32 along conductor 30, as may be done by one of ordinary skill in the art using the teachings of the present specification without undue experimentation, a substantially uniform temperature profile may be obtained over the longitudinal expanse of end turns 29 and 39. By "substantially uniform temperature profile" is meant less than about 10° C. and preferably less than about 5° C. temperature variation along each conductor.

Thus has been illustrated and described a cooling system for providing cooling of a rotor winding of a dynamoelectric machine wherein the turns are narrow such that they will not accommodate side by side passages and further wherein a substantially uniform temperature profile in the end turns of the rotor windings is obtained. Further, a system for cooling the rotor winding of a dynamoelectric machine which avoids use of pressure baffles, such as are required in ventilation schemes that discharge gas through the centering ring or the pole face of the rotor, or that have gas inlets and gas outlets disposed relatively close to each other, has been shown and described.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A rotor for a dynamoelectric machine, said rotor comprising:

A body portion defining axial coil slots circumferentially spaced on the periphery of the rotor body on either side of a pole portion of the rotor body; and,
a rotor winding, said rotor winding including:
a first plurality of axially extending slot lying coil portions disposed in said coil slots;
a first plurality of end turns extending beyond the rotor body, said first plurality of end turns including a first plurality of axial end turn portions formed by extensions of the first plurality of slot lying coil portions and a first plurality of end turn circumferential portions connecting said first plurality of axial end turn portions;
a second plurality of axially extending slot lying coil portions disposed in said coil slots, respective ones of said second plurality of slot lying portions electrically insulated from respective adjacent ones of said first plurality of slot lying portions;
a second plurality of end turns extending beyond the rotor body and alternately disposed with said first plurality of end turns, respective ones of said second plurality of end turns electrically insulated from, yet disposed in heat flow communication with respective adjacent ones of said first plurality of end turns, said second plurality of end turns including a second plurality of axial end turn portions formed by extensions of the second plurality of slot lying portions and a second plurality of end turn circumferential portions connecting said second plurality of axial end turn portions, respectively.
a first plurality of surfaces respectively disposed on said first plurality of end turns said first plurality of surfaces for defining a respective first plurality of coolant gas flow channels longitudinally extending along said first plurality of end turns, said first plurality of gas coolant channels having a respective first plurality of gas coolant inlets respectively disposed in said first plurality of end turn circumferential portions; the first plurality of gas channels extending along respective first axial end turn portions and end turn circumferential portions;

a second plurality of surfaces respectively disposed on said second plurality of end turns, said second plurality of surfaces for defining a respective second plurality of coolant gas flow channels longitudinally extending along said second plurality of end turns, said second plurality of coolant gas channels having a respective second plurality of gas coolant inlets respectively disposed in said second plurality of axial end turn portions, the second plurality of gas coolant channels extending along respective second axial end turn portions whereby the second plurality of gas coolant channels are coextensive with only a portion of the first plurality of gas coolant channels.

2. A rotor as in claim 1, wherein said pole portion has a centerline and further wherein said first plurality of coolant gas inlets are disposed proximate the centerline of said pole portion.

3. A rotor as in claim 1, wherein said second plurality of end turn circumferential portions are connected to said second plurality of axial end turn portions at a respective plurality of corners, and further wherein said second plurality of coolant gas inlets are disposed proximate the plurality of corners.

4. A rotor as in claim 2, wherein said second plurality of end turn circumferential portions are connected to said second plurality of axial end turn portions at a respective plurality of corners, and further wherein said second plurality of coolant gas inlets are disposed proximate the plurality of corners.

5. A rotor as in claim 1, wherein said first plurality of coolant gas channels include a first plurality of coolant gas outlets, said first plurality of coolant gas outlets disposed axially inboard an axial end of the rotor body.

6. A rotor body as in claim 5, wherein said first plurality of coolant gas channels include a second plurality of coolant gas outlets, said second plurality of coolant gas outlets disposed axially inboard the axial end of the rotor body.

7. A rotor as in claim 6, wherein said first and second plurality of coolant gas outlets are disposed in mutual gas flow communication.

8. A rotor as in claim 1, wherein insulation is disposed between adjacent ones of said first and second plurality of end turns and further wherein said first and second plurality of surfaces are disposed such that in combination with the first and second plurality of gas flow channels, the insulation forms a first and second plurality of gas flow ducts, respectively.

9. A rotor as in claim 1, wherein said first plurality and second plurality of coolant gas inlets are respectively disposed such that a substantially uniform temperature profile is obtained in said first and second plurality of end turns during operation of said rotor.

10. A rotor for a dynamoelectric machine, said rotor comprising:
a body portion defining axial winding slots circumferentially spaced on the periphery of the rotor body on either side of a pole portion of the rotor body; and
a rotor winding, said rotor winding including:
a plurality of axially extending slot lying portions disposed in said winding slots;
a plurality of end turns extending beyond the rotor body and coupled to said plurality of slot lying portions, respective ones of said plurality of end turns electrically insulated from yet disposed in heat flow communication with adjacent ones of said plurality of end turns;
first gas coolant means defined in part by preselected ones of said plurality of end turns, said first gas coolant means having a first coolant gas inlet and a first coolant gas outlet; and,
second gas coolant means defined in part by preselected other ones of said plurality of end turns, said second gas coolant means having a second coolant gas inlet and a second coolant gas outlet;
wherein the developed length between the first coolant gas inlet and the first coolant gas outlet is greater than the developed length between the second coolant gas inlet and the second coolant gas outlet and further wherein said first gas coolant means and said second gas coolant means are the only coolant means defined by the preselected ones and the preselected other ones of said plurality of end turns, respectively;
wherein the preselected ones of said plurality of end turns span the pole portion and said first coolant gas inlet is disposed proximate the center of the pole portion; and, wherein the preselected other ones of said plurality of end turns span the pole portion and include a corner between the center of the pole portion and the axial end of the rotor body and further wherein said second coolant gas inlet is disposed proximate the corner.

11. A rotor as in claim 1, wherein the first and second coolant gas outlet are disposed in mutual gas flow communciation.

12. A rotor as in claim 1, wherein said first coolant means includes a surface for defining a channel wherein the channel is enclosed in part by insulation to form a duct.

13. A rotor as in claim 1, wherein said second coolant means includes a surface for defining a channel wherein the channel is enclosed in part by insulation to form a duct.

14. A rotor as in claim 1, wherein said second coolant gas inlet is disposed between the center of the pole portion and the axial end of the rotor body.

* * * * *